Aug. 25, 1942.  W. J. PELCHER ET AL  2,294,317

VISOR CONSTRUCTION

Filed March 22, 1940

INVENTORS.
WALTER J. PELCHER &
ALTON J. DIEROFF
BY Parker & Burton
ATTORNEYS.

Patented Aug. 25, 1942

2,294,317

UNITED STATES PATENT OFFICE 2,294,317

VISOR CONSTRUCTION

Walter J. Pelcher and Alton J. Diroff, Monroe, Mich., assignors to Woodall Industries Incorporated, Detroit, Mich., a corporation of Michigan Application March 22, 1940, Serial No. 325,298

3 Claims. (Cl. 296—97)

This invention relates to improvements in visors and particularly to that type of visor used as shields or sun visors in the interior of automobile bodies.

An object is to provide a visor assembly which is capable of being moved to a plurality of positions of angular adjustment with respect to its support.

A further object is to provide a visor possessing the above characteristics which is simple, inexpensive and of sturdy construction and which is readily movable to any desired permitted position and which will retain the position to which it is moved against displacement produced by travel of the car over the road.

A further object is to provide a visor construction of the character described which may be completely enclosed with trim cloth or other suitable covering material to harmonize with the interior trim of the automobile body and the working parts of which are entirely concealed by such trim material.

Another object is to provide a visor which is rotatable to a plurality of angular positions with respect to its supporting rod and which is so constructed as to be easily lifted from an "in use" lowered position to an "out of use" elevated position but resistance to movement of the visor from an out of use elevated position to an in use lowered position is substantially greater whereby any tendency of the visor panel to drop due to shock of travel over the road is minimized.

More particularly an object is to provide a visor panel structure which may be carried by any suitable bracket rod and which is coupled with the rod through visor adjustment and retaining means, which means is rotatably adjustable with respect to the rod to permit angular adjustment of the visor thereabout and which visor is adjustable lengthwise with respect to the means to permit adjustment of the visor longitudinally with respect to its supporting rod.

Figure 1:
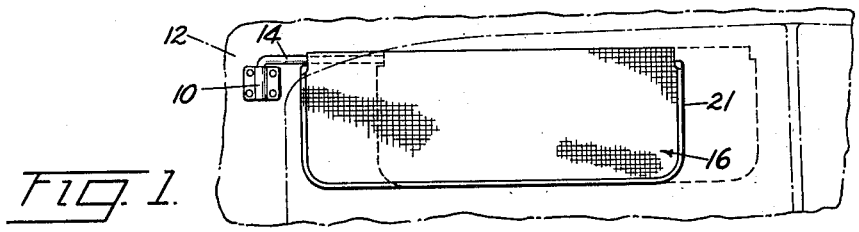
Figure 2:
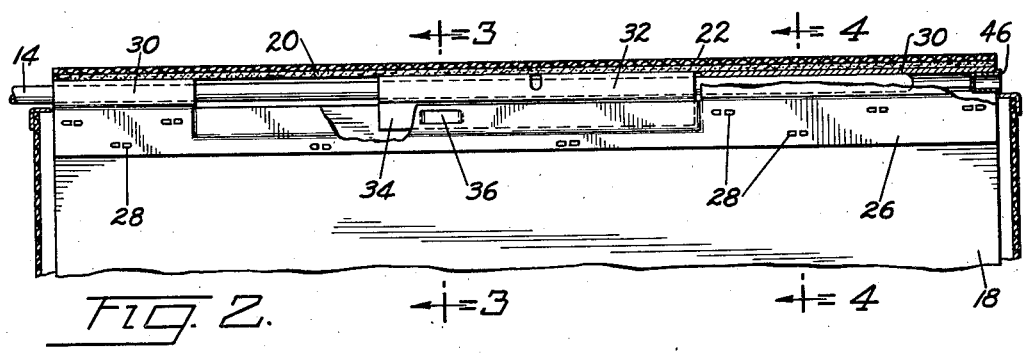
Figure 3:
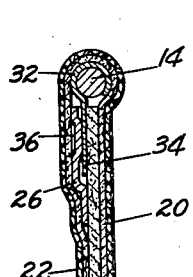
Figure 4:
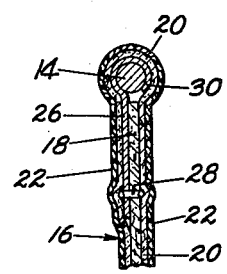
Figure 5:
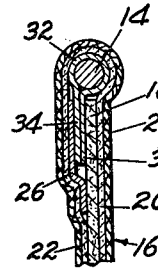
Figure 6:
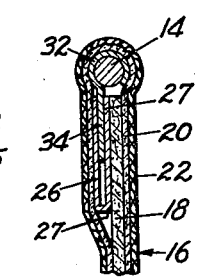
Figures 7, 8:
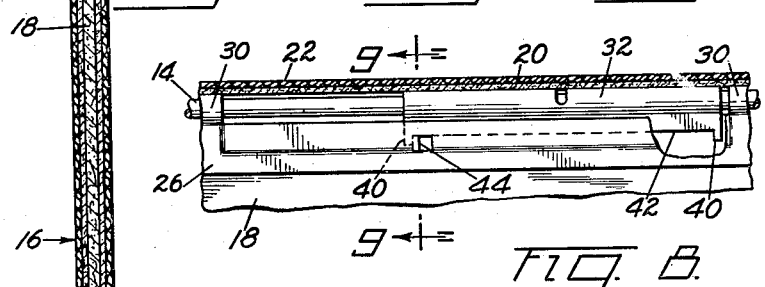
Figure 9:
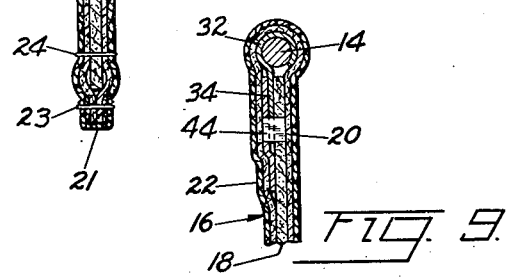

The above objects, together with others, will more fully appear from the following description, appended claims, and accompanying drawing, wherein:

Figure 1 is an elevation of a fragment of the interior of an automobile body showing an embodiment of my improved visor therein, Fig. 2 is a fragmentary sectional view through the visor structure showing the adjustment features wherein the invention lies, Fig. 3 is a vertical sectional view taken on 3—3 of Fig. 2, Fig. 4 is a fragmentary vertical sectional view taken on 4—4 of Fig. 2, Fig. 5 is a fragmentary vertical sectional view through a slightly modified form of construction taken on the same line as the view of Fig. 3, Fig. 6 is a fragmentary vertical sectional view through a slightly modified form of construction taken on the same line as that of Fig. 3, Fig. 7 is a fragmentary vertical sectional view through a modified form of construction taken on the same line as that of Fig. 3, Fig. 8 is a view partly in section and partly in elevation of a fragment of a modification of the visor structure, and Fig. 9 is a sectional view on line 9—9 of Fig. 8.

My improved visor structure is adapted to be associated with suitable supporting means wherein there is customarily provided a bracket supported at one end to permit swinging of the visor to a position overlying the windshield or to a position overlying the slidable pane in the front door of the vehicle body. Any suitable mounting for this swinging movement may be utilized. In the view shown there is a supporting element 10 which is fastened to a body header 12 and there is a bracket rod 14 which is secured at one end within the support 10 for swingable movement. The visor panel 16 is supported upon the rod 14. The invention resides in the support of the panel on the rod to permit the angular and longitudinal adjustments herein described. The panel itself may be of any suitable form.

As shown herein it comprises a panel indicated in assembly as 16 but embodying an interior foundation sheet 18 about which is wrapped a sandwich lamination made up of two layers 20 and 22. The outer layer 22 may be of trim cloth or any suitable covering material. The interior layer may be of stiffening material such as a thin deformable asphalt impregnated fiber sheet which is adapted to be folded about the panel foundation element 18. A binding 21 may be stitched about the margin along the bottom and ends of the visor element as by stitches 13. The line of stitching 24 may also be provided to assist in the formation of decorative sheet. These are all conventional features.

Along the upper margin of the visor panel foundation 18 a sheet metal strip 26 is secured by means of wire stitches 28 or in any other suitable fashion. This strip 26 is provided with rolled over end portions 30 which form split tubes that are freely mounted on the bracket rod 14 to permit the visor panel to be rotated thereabout or to be moved longitudinally therealong. As shown in Fig. 2 the strip is cut away between these end portions 30. The end portions may be of any desired length. These end portions while they serve to mount the visor upon the supporting bracket rod for adjustment longitudinally thereof or rotatably thereabout do not frictionally so grip the rod as to function to maintain it at its positions of adjustment thereon. It is maintained at these positions of adjustment by mechanism hereinafter described.

There is provided what might be termed visor adjustment and retaining means in the form of a gripping member mounted on the rod between the end portions 30 of the strip. This member has a split tubular portion 32, as shown in Figs. 2 to 9, inclusive, which tubular portion has such an interior diameter and is resiliently so formed that it grippingly embraces the rod 14. Its smug frictional engagement with the rod is of such a character that though it may be rotated to different angular positions thereabout it will maintain itself frictionally at any position to which it is rotated. Due to the split tubular character of this member it is relatively easy to lift the visor up but as the visor is moved downwardly the split tube wraps about the rod and downward movement is resisted to a greater extent than upward movement whereby any tendency of the visor panel to drop from the elevated position due to road travel is strongly resisted.

This adjustment and retaining member has a lip portion 34 which is shown in Figs. 2 and 3 as frictionally gripped between the visor foundation panel 18 and an intermediate portion of the metal strip 26. This intermediate portion of the strip 26 is bent slightly laterally as shown in Figs. 2 and 3 and provided with an inwardly projecting detent 36 to frictionally bear against the lip 34 of the retaining member.

Due to the frictional engagement of the lip 34 of the retaining member between the strip 26 and the foundation element 18 the visor is held to rotate with the retaining member about the rod 14 and is held at any angular position which such retaining member assumes and retains with respect to this rod. With respect to the supporting rod the visor panel may therefore be moved to any desired angular position due to rotation of the retaining member about the rod or to any desired position longitudinally of the rod due to movement of the panel with respect to the retaining member.

In Fig. 5 a slightly different construction is shown in that the retaining member has its tubular portion 32 provided with two overlapping leaves 34 and 35 which are jointly received between the strip 26 and the panel foundation 18. In the construction of Fig. 5 the movement of the retaining member rotatably about the supporting rod 14 would be equally resisted in either direction of rotation.

In Fig. 6 the construction differs from that of Fig. 3 only in that the strip 26 which is secured to the visor foundation panel 18 is provided with an extension 27 folded under the strip so that the lip or leaf 34 of the retaining member is held between the two parts 26 and 27 of the strip and the frictional engagement therebetween is particularly effective.

In the construction of Fig. 7 there is a slight difference as compared with the structures hereinabove described in that the intermediate section of the rod 14 is serrated or corrugated as shown and the tubular portion 32 of the retaining member is correspondingly corrugated so that the retaining member in its rotation about the rod will click therearound from one angular position to another and will be securely held at any one of the provided angular positions.

In Fig. 8 the modified form of construction shown possesses certain advantages over the construction shown in Fig. 2. In the structure of Fig. 8 the lip 34 of the split tube 32 is cut away as at 42 providing end stops or projections 40. The metal strip 26 is provided with an inturned ear 44 which is received within the cut out 42 of the lip. This ear shown in Fig. 9 is extended through the foundation board 18 at right angles to the plane of the strip 26. This ear is adapted to form a stop which engages the stops 40 of the lip so as to limit the slidable adjustment of the panel longitudinally of the rod 14.

There is also shown in Fig. 2 a plug or cap 46 which is received within the outer end of the rolled over portion of the metal strip 26 and which is removable. Upon removal of this cap a continuing visor section provided with a rod capable of being inserted into the tubular roll 30 may be attached as is well understood.

What we claim:

1. Visor mechanism comprising a supporting rod, a visor panel, a metal strip secured to and extending along one margin of the panel and provided at each end with a tubular portion journalled directly on the rod for rotation thereabout and for movement longitudinally therealong, said strip having a portion intermediate said tubular portions deformed laterally away from the panel, a split tube grippingly embracing the rod between said tubular portions for resisted rotatable adjustment thereabout, one margin of the split tube terminating in a lip interposed between the panel and the deformed portion of the metal strip to cause the split tube and panel to rotate together about the rod and as to permit slidable adjustment of the panel along the lip longitudinally of the rod, said lip being cut out intermediate its ends, said strip having a stop part turned into the cut out of the lip to limit the slidable movement of the panel longitudinally of the rod.

2. Visor mechanism comprising, in combination, a supporting rod, a visor panel, a metal strip extending along and secured to one margin of the panel, said strip being provided with a tubular portion at each end freely journalled directly on the rod for rotation thereabout and movement lengthwise therealong, said strip being cut away beyond the margin of the panel between its tubular portions, that portion of the strip secured to the panel between said tubular portions being spaced laterally from the panel, a split tube grippingly embracing the supporting rod between the tubular portions of the strip for resisted rotatable adjustment about the rod, said tube having one margin only bent outwardly radially forming a lip disposed between the panel and that portion of the panel strip extending between said tubular portions holding the panel to rotate therewith about the rod, said panel and strip being adapted for resisted slidable movement lengthwise along the lip longitudinally of the rod.

3. Visor mechanism comprising, in combination, a supporting rod, a visor panel provided along one margin with a tubular portion journalled upon the rod for free rotatable and longitudinal movement, a split tube grippingly embracing the rod for resisted rotatable adjustment thereabout, one margin of said tube terminating in a radially projecting lip, and the other margin of the split tube terminating grippingly engaging the rod, said panel provided with means engaging the lip to rotate the tube with the panel about the rod tending to wrap the tube about the rod in one direction of rotation thereabout and tending to unwrap the tube in the opposite direction of rotation, said means frictionally engaging the lip to permit resisted adjustment of the panel thereover lengthwise of the rod.

WALTER J. PELCHER.
ALTON J. DIROFF.